Patented Nov. 17, 1931

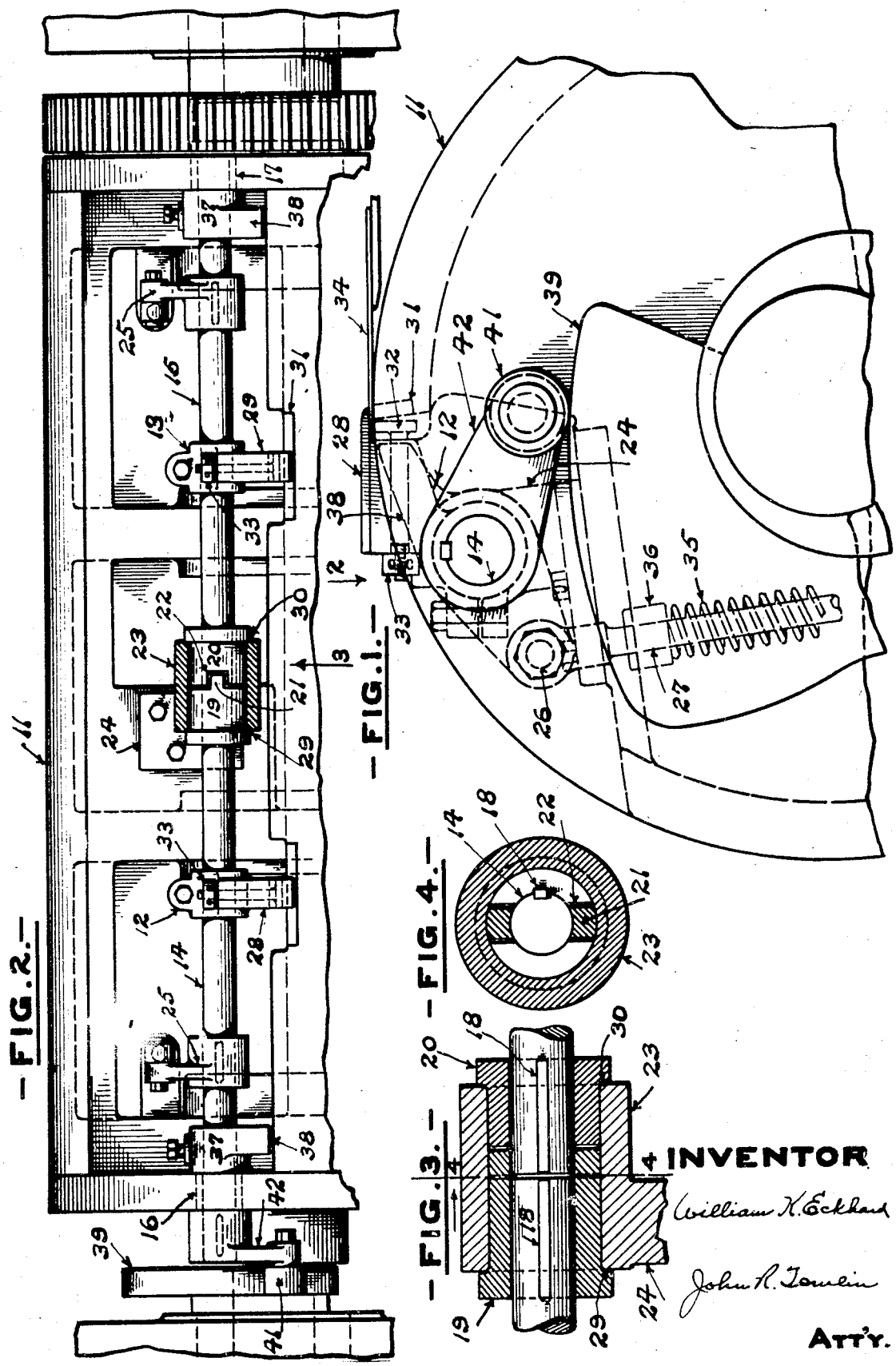

1,832,284

UNITED STATES PATENT OFFICE

WILLIAM K. ECKHARD, OF DUNELLEN, NEW JERSEY, ASSIGNOR TO R. HOE & CO., INC., OF NEW YORK, N. Y., A CORPORATION OF NEW YORK

GRIPPER MECHANISM FOR PRINTING MACHINES

Application filed September 26, 1929. Serial No. 395,278.

This invention relates to gripper mechanism for sheet fed printing machines, and is especially applicable to machines for printing on heavy sheet material such as tinned iron. The coating on such sheets is frequently of an uneven thickness along the edges and with the gripper mechanism ordinarily used, when one of the grippers engage the material at a thick point, it prevents the other gripper from engaging at a thinner point.

With the mechanism herein disclosed, means are provided for so operating the grippers that they will both engage the sheet even although there is a variation in its thickness at the points of engagement.

The object of the invention is to provide a mechanism whereby a plurality of sheet grippers are operated in unison by a single instrumentality and yet are permitted to act independently of each other to the extent that they will firmly hold a sheet, the thickness of which varies at the points of engagement.

It is also an object of the invention to provide a gripper mechanism for sheet fed printing machines of generally improved construction, whereby the mechanism will be simple, durable and inexpensive in construction, as well as convenient, practical, serviceable and efficient in its use.

With the foregoing and other objects in view, which will appear as the description proceeds, the invention resides in the combination of parts, and in the details of construction hereinafter described and claimed, it being understood that various changes in the precise embodiment of the invention herein disclosed may be made within the scope of what is claimed without departing from the spirit of the invention.

Figure 1 is an end view of a portion of the impression cylinder of a printing machine showing a sheet gripper and its operating mechanism;

Figure 2 is a plan view of a portion of the cylinder shown in Figure 1, the view which is partly in section, being taken in the direction indicated by arrow 2 of Figure 1, and showing the compensating mechanism that is the subject of the invention;

Figure 3 is an enlarged sectional view of the compensating mechanism as seen in the direction of arrow 3 of Figure 2; and Figure 4 is a sectional view of the compensating mechanism as it appears on the line 4—4 of Figure 3.

Referring to the drawings 11 indicates the impression cylinder of a printing machine. Gripper arms 12 and 13, are secured respectively to the gripper shafts 14 and 15, rotatably supported at their outer ends in bearings 16 and 17, in the ends of the cylinders.

The inner ends of the gripper shafts are fitted with keys 18, which secure compensating clutch members 19 and 20 to their respective shafts. The clutch member 19 is formed with a tongue 21, which engages with groove 22 in the member 20. The width of the groove 22 is made greater than the width of the tongue 21 for a purpose that will hereinafter appear.

The outside of the clutch members are fitted to rotate in a bearing 23, formed in the bracket 24, which is secured to the cylinder 11. Shoulders 29 and 30 are formed on the clutch members 19 and 20, and engage the ends of the bearings 23, thereby forming thrust bearings which insure the proper clearance between the clutch members.

An arm 25 is secured to each of the gripper shafts and is pivotally connected at 26 with a rod 27. Gripper fingers 28 and 29 are secured respectively to the gripper arms 12 and 13 and engage with an abutment 31, formed on the cylinder. Sheet registering stops 32 are provided on the gripper arms and are adjustable by the nuts 33. These stops serve as an abutment for the edge of the sheet 34 which, as shown in Figure 1 is being held by the gripper finger. A spring 35 bears against a collar 36, secured to the rod 27 and serves to bias the gripper to the closed position.

Thrust collars 37 are also secured to the gripper shafts and are formed with arms 38, which serve as emergency stops in case the grippers become displaced.

Means for operating the grippers is provided by the stationary cam 39, that is secured to the frame, and which is engaged by the roller 41, carried by the arm 42, secured to the gripper shaft 14.

It is apparent that rotation of the cylinder will result in opening and closing the grippers 12 and 13, and that the looseness in the compensating coupling, comprising the members 19 and 20, will permit a limited free movement of either gripper with respect to the other. Thus each gripper will be forced into proper engagement with the sheet even though one engages it at a spot that is thicker than the spot engaged by the other gripper.

The invention has been disclosed in the preferred embodiment but it will be understood that other arrangements may be used or additional grippers employed within the scope of the invention.

What I claim is:

1. In a gripper mechanism for a printing machine, a plurality of grippers supported on a plurality of shafts and adapted to engage a sheet, separate means for closing each gripper, and a means acting on all of the grippers to open them.

2. In a gripper mechanism for a printing machine, a plurality of grippers supported on a plurality of shafts and adapted to engage a sheet, means acting to separately bias each gripper to the closed position, and a single instrumentality acting to open said grippers collectively.

3. In a gripper mechanism for a printing machine, a plurality of grippers adapted to engage a sheet, a gripper shaft for each gripper, compensating members connecting the gripper shafts whereby each shaft is allowed a slight independent rotational movement, and means for opening and closing the grippers.

4. In a sheet gripper mechanism, a pair of independent gripper shafts in alignment, a gripper secured to each shaft and biased to the closed position, compensating members loosely connecting the shafts, and means for periodically rotating one of the shafts to open the grippers.

5. In a sheet gripper mechanism; a pair of independent gripper shafts rotatably supported in alignment; a gripper secured to each shaft; means connected to each shaft to bias the grippers to closed positions; means acting to rotate one of the shafts to open a gripper; and means connecting the said shaft to the other shaft, whereby the latter is rotated when the first mentioned shaft is turned, and whereby free movement is permitted to an extent sufficient to allow both grippers to engage a sheet, the thickness of which varies at the points of engagement.

6. In a sheet gripper mechanism, a pair of grippers each secured to a separate shaft and separately biased to the closed position, a loose connection between the grippers whereby a limited free movement of either gripper relative to the other is permitted, and a means for opening both grippers.

7. In a sheet gripper mechanism, a pair of gripper shafts, grippers secured to the shafts, means whereby each gripper is separately biased to the closed position, a loose connection between the shafts, and a means for opening both grippers.

In testimony whereof, I affix my signature.

WILLIAM K. ECKHARD.